US007355304B2

(12) United States Patent
Diaz Carmena et al.

(10) Patent No.: US 7,355,304 B2
(45) Date of Patent: Apr. 8, 2008

(54) X-RAY DEVICE

(75) Inventors: Francisco Diaz Carmena, Algete (ES); Alfonso Querol Siles, Algete (ES); Angel Diaz Carmena, Algete (ES); José Luis Alvarez Dominguez, Algete (ES)

(73) Assignee: Sociedad Española De Electromedicina Y Calidad, S.A., Algete (ES)

( * ) Notice: Subject to any disclaimer, the term of this patent is extended or adjusted under 35 U.S.C. 154(b) by 415 days.

(21) Appl. No.: 10/524,576

(22) PCT Filed: Feb. 7, 2003

(86) PCT No.: PCT/ES03/00069

§ 371 (c)(1),
(2), (4) Date: Feb. 15, 2005

(87) PCT Pub. No.: WO2004/071137

PCT Pub. Date: Aug. 19, 2004

(65) Prior Publication Data

US 2005/0231178 A1 Oct. 20, 2005

(51) Int. Cl.
*H02J 1/00* (2006.01)

(52) U.S. Cl. .................................................. 307/80

(58) Field of Classification Search .................. 307/80
See application file for complete search history.

(56) References Cited

U.S. PATENT DOCUMENTS 4,601,051 A * 7/1986 Santurtun et al. ........... 378/118

FOREIGN PATENT DOCUMENTS

| | | |
|---|---|---|
| FR | 2 682 830 | 4/1993 |
| JP | 09/180895 | 7/1997 |
| WO | WO 01/76049 | 10/2001 |
| WO | WO 02/35692 | 5/2002 |

* cited by examiner

*Primary Examiner*—Robert L. Deberadinis
(74) *Attorney, Agent, or Firm*—Collard & Roe, P.C.

(57) ABSTRACT

X-Ray equipment, that as well as having a controlled current converter, a capacitor bank, an inverter, a supply source, and a high voltage transformer, has inlet voltage evaluation equipment that activates relays of the connection points of an auxiliary supply transformer so that it is not necessary to manually carry out any change in the supply connections depending on the supply voltage. Furthermore it is possible to carry out the charging of the capacitors in a programmed manner, and the charging voltage of the capacitor bank is fixed and independent of the supply voltage, the equipment being able to operate automatically at a voltage between 90 and 264 volts.

7 Claims, 1 Drawing Sheet

X-RAY DEVICE

CROSS REFERENCE TO RELATED APPLICATIONS

Applicants claim priority under 35 U.S.C. §365 of PCT/ES2003/000069 filed on Feb. 7, 2003. The international application under PCT article 21(2) was not published in English.

BACKGROUND OF THE INVENTION

The subject of this invention is X-ray equipment, among that used for the analysis and diagnosis of illnesses in medicine.

The subject of this invention is not only the equipment itself, but also the totality of elements that it features with the purpose of providing it with the characteristics that have been described in the first claim.

This invention is characterized by the possibility that it offers of being able to use the equipment independently of the supply voltage, it being unnecessary to make any structural change, since the machine automatically detects the input voltage and acts so that the actual equipment and the rest of the elements or auxiliary apparatus connected to the apparatus can work properly without it being necessary to make any change in the connection of the equipment supply.

The present invention is also characterized by the possibility of acting on the manner and conditions in which the supply of input current is carried out.

Therefore, the present invention is encompassed within the field of equipment used in radiography.

Until the present time equipment used in radiography has the drawback of operating at different supply voltages, especially as regards auxiliary equipment connected to it, such as, for example, collimators, ionisation chambers, brakes etc. This equipment is supplied using transformers or autotransformers with a series of selectable outlets, that, depending on the input voltage, some or others are selected. This obliges a manual change to be made at the moment of setting-up, depending on the input voltage. An action that is only carried out on connecting the equipment to the supply if the supply voltage is not correct it can damage said equipment not connected to the appropriate supply voltage.

On the other hand, it also happens that in certain installations, depending on the quality of the electrical supply, it can happen that a dip in the supply from the network takes place, due to the demand of the X-ray equipment, because of which the use of said apparatus becomes incompatible with the supply that there is in the area.

It also occurs that some X-ray equipment is not equipped with the necessary electronics for its operation at voltages different to those for which it has been designed.

Therefore the purpose of the present invention is that of developing X-ray equipment that allows its use independently of the supply voltage and frequency, where it is not necessary to carry out any change-over or selection action of the appropriate outlet of the auto-transformer for the supply of auxiliary equipment, depending on the supply voltage of the equipment, and where, furthermore, with the purpose of avoiding the dip in the network supply, it be possible to program the current so that it be adapted to the characteristics of the service.

SUMMARY

The proposed invention of X-ray equipment allows radiography activities to be carried out independently of the input voltage and frequency, being valid for a range of 90 to 264 V of alternating current, as well as for 50 or 60 Hz.

The equipment has a Buck-boost type controlled converter, connected to a bank of capacitors, which are charged at a fixed voltage, independently of the supply voltage. At the outlet of the bank of capacitors a controlled inverter is placed, in whose outlet a step-up transformer, which is connected directly with the X-ray tube, is placed.

The converter allows the charging of the bank of capacitors to be carried out in a controlled manner, by means of an input current programmer, which avoids dips in the networks in areas that are less interconnected or directly supplied through independent supply sets. Furthermore, and thanks to the fact of allowing the charging of the bank of capacitors to be carried out in a controlled manner, the overload of the network supply connection is avoided, both in the actual cable and in the socket.

Furthermore, the equipment has a network voltage control unit, governed by means of a microprocessor, which carries out both evaluation of the input voltage and determined actions, which for a given supply voltage activates solid state relays corresponding to the correct supply input of the auto-transformer, with the purpose of obtaining the most suitable supply for the different auxiliary equipment, such as brakes, collimators, or ionisation chambers.

DESCRIPTION OF THE DRAWINGS

To supplement the description that made herein, and with the aim of leading to a better understanding of its characteristics, this specification is accompanied by a set of drawings in whose figures, in an illustrative and non-limiting way, the most significant details of the invention have been represented.

DETAILED DESCRIPTION

Figure 1:
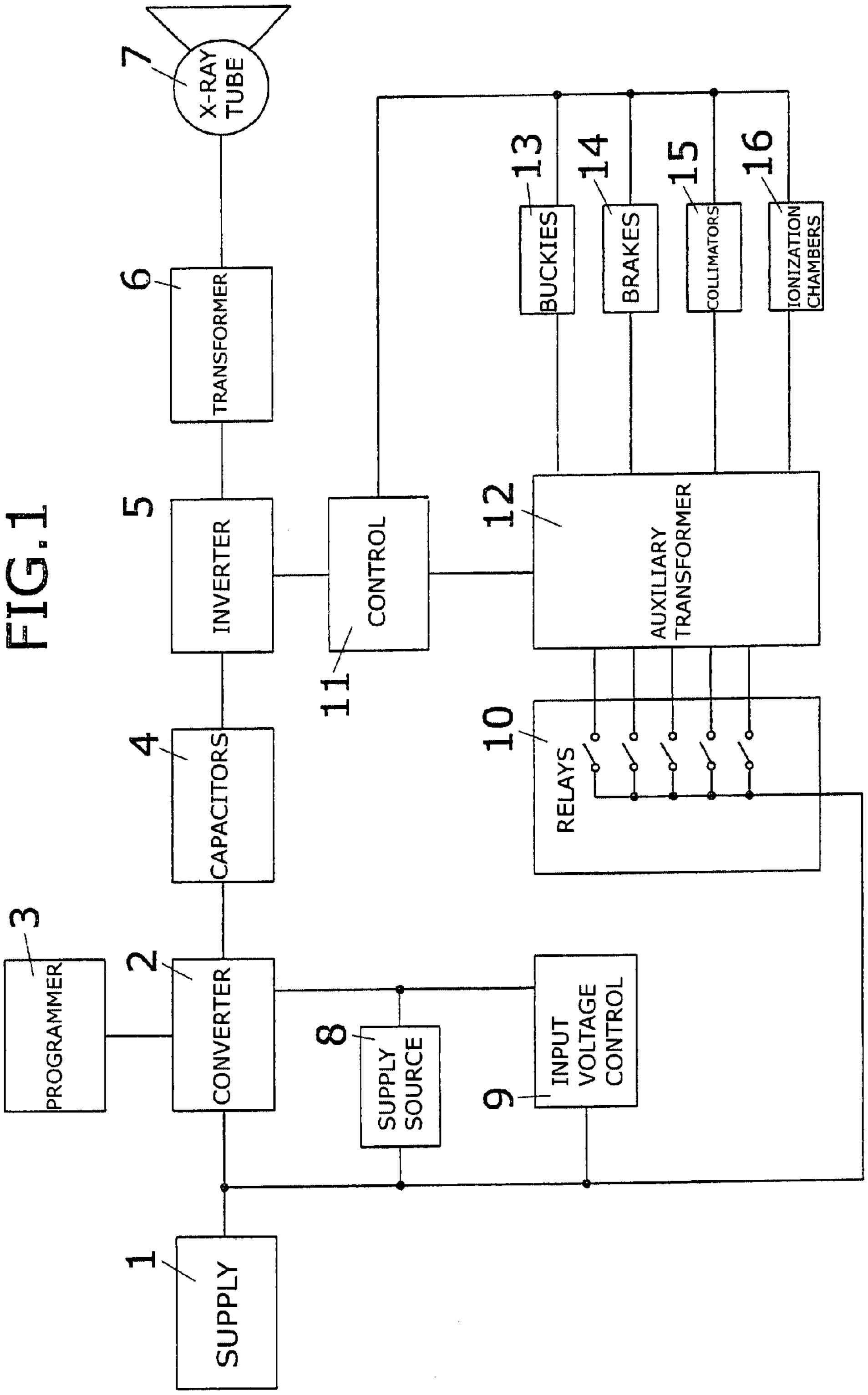
FIG. 1. Shows a representation of the different blocks that form the X-ray equipment that is the subject of the invention.

In view of the figures mentioned a method of preferable embodiment of the invention is described below, as well as an explanation of the drawings.

In FIG. 1 we can see that the supply (1) of the equipment comes both to an AC-DC universal voltage source (8), as well as to a controlled current converter (2), and to input voltage control equipment (9).

This equipment (9) is that in charge with evaluating the input voltage, and based on this latter, of activating relays (10) that can be normal or solid state. Said relays (10) are the different input connections for an auxiliary transformer (12) with the purpose that the auxiliary equipment, such as buckies (13), brakes (14), collimators (15) and ionisation chambers (16) are supplied at the proper voltage.

The X-ray equipment has a controlled current (2) converter, on which an input current programmer (3) acts, so that the charging of the bank of capacitors (4) can be programmed, fairly rapidly, with the purpose of avoiding a dip in the distribution network, due to lack of generation; and also that the overload of the connection point to the supply network is avoided.

The controlled current converter (2) allows the bank of capacitors to be charged at a fixed voltage and independent of the supply voltage, the voltage to which the X-ray equipment is connected not mattering in any way. To said bank of capacitors (49) a power inverter (5) is connected, whose outlet is connected to a step-up transformer (6), these latter being governed by a control (11). The X-ray tube (7) is connected to the high voltage transformer (6).

It is not considered necessary to make more this description more extensive in order that any expert in the material may understand the scope of the invention and the advantages arising from it.

The materials, shape, size and layout of the parts will be liable to variation provided they don't alter essential nature of the invention.

The terms in which this report has been described must always be taken in a broad and non-restrictive sense.

The invention claimed is:

1. An X-Ray device comprising:

a) a power supply;

b) an AC-DC universal supply source coupled to said power supply;

c) a controlled current converter coupled to said universal supply source;

d) a capacitor bank coupled to said controlled circuit converter;

e) an inverter coupled to said capacitor bank;

f) a high voltage transformer coupled to said inverter;

g) a control unit coupled to said inverter wherein said inverter and said transformer are controlled by said control unit;

h) an input current programmer coupled to said controlled current converter which is programmed to prevent dips in a network caused by charging capacitors in said capacitor bank as well as overloading of a network supply connection;

i) an input voltage control coupled to said controlled current converter for evaluating an input voltage;

j) an auxiliary transformer coupled to said controlled current converter;

k) a plurality of relays coupled to said auxiliary transformer; and l) a plurality of auxiliary components coupled to said auxiliary transformer.

2. The device as in claim 1, wherein said plurality of auxiliary components comprise a plurality of buckies.

3. The device as in claim 1, wherein said plurality of auxiliary components comprise at least one brake.

4. The device as in claim 1, wherein said plurality of auxiliary components comprise a plurality of collimators coupled to said auxiliary transformer.

5. The device as in claim 1, wherein said plurality of auxiliary components comprise a plurality of ionization chambers coupled to said auxiliary transformer.

6. The device as in claim 1, wherein said plurality of auxiliary components comprise an x-ray tube coupled to said transformer.

7. The device as in claim 1, wherein said plurality of relays comprise solid state relays.

* * * * *